US009209872B2

(12) United States Patent
Stacey et al.

(10) Patent No.: US 9,209,872 B2
(45) Date of Patent: Dec. 8, 2015

(54) MU-MIMO ACCESS POINT AND USER STATION INCLUDING METHODS FOR MULTI-USER GROUP MANAGEMENT

(75) Inventors: Robert J. Stacey, Portland, OR (US); Xiaohong X. Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 12/975,614

(22) Filed: Dec. 22, 2010

(65) Prior Publication Data

US 2012/0163483 A1    Jun. 28, 2012

(51) Int. Cl.
*H04L 27/28* (2006.01)
*H04B 7/04* (2006.01)
*H04L 5/00* (2006.01)
*H04W 8/18* (2009.01)
*H04L 1/00* (2006.01)
*H04L 1/06* (2006.01)
*H04L 1/16* (2006.01)

(52) U.S. Cl.
CPC ............ *H04B 7/0452* (2013.01); *H04L 5/0023* (2013.01); *H04L 5/0037* (2013.01); *H04L 5/0094* (2013.01); *H04W 8/186* (2013.01); *H04L 1/0026* (2013.01); *H04L 1/0643* (2013.01); *H04L 1/1607* (2013.01)

(58) Field of Classification Search
CPC .. H04B 7/0452; H04L 5/0037; H04L 1/1614; H04L 1/1607; H04W 8/186; H04W 72/121; H04W 4/08; H04W 72/046
See application file for complete search history.

(56) References Cited

U.S. PATENT DOCUMENTS

2008/0062178 A1    3/2008    Khandekar et al.
2008/0219194 A1    9/2008    Kim et al.
(Continued)

FOREIGN PATENT DOCUMENTS

CN    103380577 A    10/2013
JP    2001517044 A    10/2001
(Continued)

OTHER PUBLICATIONS

IEEE 802.11-09/0992r13, IEEE P802.11 Wireless LANs, Specification Framework for TGac, Jul. 2010.*
(Continued)

*Primary Examiner* — Aristocratis Fotakis
(74) *Attorney, Agent, or Firm* — Schwegman Lundberg & Woessner, P.A.

(57) ABSTRACT

Embodiments of a MU-MIMO access point, user station and method for multi-user group management are generally described herein. In some embodiments, a MU-MIMO access point may assign a MU group identifier (GID) and a group member index (GMI) to each of a plurality of associated user stations. The MU-MIMO access point may transmit a MU-MIMO transmission that includes a plurality of spatial streams. The MU-MIMO transmission may be destined for the user stations of a single MU group indicated by a GID that is included within the MU-MIMO transmission. A subset of the spatial streams may be intended for each user station of the indicated MU group that is identified by the GID transmitted within the MU-MIMO transmission. A user station may use its assigned GMI along with an $N_{sts}$ field in the MU-MIMO transmission to determine which of the spatial streams to demodulate.

20 Claims, 5 Drawing Sheets

(56) References Cited

U.S. PATENT DOCUMENTS

| | | | |
|---|---|---|---|
| 2011/0044266 A1* | 2/2011 | Shrivastava et al. | 370/329 |
| 2011/0103280 A1* | 5/2011 | Liu et al. | 370/311 |
| 2011/0128947 A1* | 6/2011 | Liu et al. | 370/338 |
| 2011/0188598 A1* | 8/2011 | Lee et al. | 375/267 |
| 2011/0243081 A1* | 10/2011 | Liu et al. | 370/329 |
| 2012/0063335 A1* | 3/2012 | Cho et al. | 370/252 |
| 2012/0120931 A1* | 5/2012 | Abraham et al. | 370/338 |
| 2012/0218982 A1* | 8/2012 | Lee et al. | 370/338 |

FOREIGN PATENT DOCUMENTS

| | | |
|---|---|---|
| JP | 2013524649 A | 6/2013 |
| JP | 2013528329 A | 7/2013 |
| JP | 2013529011 A | 7/2013 |
| WO | WO-2009121025 A2 | 10/2009 |

OTHER PUBLICATIONS

"International Application Serial No. PCT/US2011/063049, International Preliminary Report on Patentability mailed Jul. 4, 2013", 6 pgs.

Li, Qinghua, et al., "MIMO techniques in WiMAX and LTE: a feature overview", IEEE Communications Magazine, 48(5), (May 2010), 86-92.

Tandai, Tomoya, et al., "An efficient uplink multiuser MIMO protocol in IEEE 802.11 WLANs", 2009 IEEE 20th International Symposium on Personal, Indoor and Mobile Radio Communications, (2009), 1153-1157.

"Specification Framework for TGac", IEEE P802.11 Wireless LANs, (Sep. 16, 2010), 9 pgs.

"Japanese Application Serial No. 2013-546177, Office Action mailed Jun. 3, 2014", 7 pgs.

Asai, Yusuke, et al., "Update of Interference Management Using Beamforrning Technique in OBSS Environment", IEEE802.11-10/1121r0, (Sep. 13, 2010), 24 pgs.

Joonsuk, Kim, et al., "Group ID Concept for DL MU-MIMO Transmission", IEEE 802.11-10/0073r2, (Mar. 15, 2010), 10 pgs.

Kang, Byeongwoo, et al., "PHY Power Saving Features for llac", IEEE 802.11-10/0785r1, (Jul. 14, 2010), 26 pgs.

Kim Jonsuk etal "Grup-ID in VHT-SIG Field" IEEE802.11-10/0582r1, (May 17, 2010), 5 pgs.

Lee, Daewon, et al., "MU-MIMO STA scheduling strategy and Related PHY signaling", IEEE 802.11-10/0362r2, (Mar. 15, 2010), 15 pgs.

Lee, Daewon, et al. "STA MU-MIMO Group Management Signaling Design", IEEE ' 802.11-10/0782r0, (Jul. 13, 2010), 18 pgs.

Ravi, Mahadevappa, et al., "Stream Partition Index for MU-MIMO Transmissions", IEEE 802.11-10/0819r1, (Jul. 12, 2010), 16 pgs.

Sampath, Hemanth, et al., "802.11ac Preamble", IEEE 802.11-10/876r1, (Jul. 15, 2010), 18 pgs.

Sandhya, Patil, et al., "DL MU TXOP Power Save", IEEE 802.11-10/1302r0, (Nov. 7, 2010).

Shapira, Nir, et al., "Reducing Channel Dimension in MU-MIMO Explicit Feedback Operation", IEEE 802.11-1114r1, (Sep. 15, 2010), 10 pgs.

Stacey, Robert, et al., "Specification Framework for TGac", IEEE 802.11-09/0992r18, Document is dated Sep. 16, 2010 but uploaded to IEEE Nov. 11, 2010, 40 pgs.

Vermani, Sameer, et al., "Frame Format for GroupID Management", IEEE 802.11-10/1288r1, (Nov. 8, 2010), 7 pgs.

"European Application Serial No. 11850482.8, Office Action mailed Aug. 21, 2013", 2 pgs.

"European Application Serial No. 11850482.8, Response filed Feb. 28, 2014 to Office Action mailed Aug. 21, 2013", 11 pgs.

"Japanese Application serial No. 2013-546177, Response filed Oct. 31, 2014 to Office Action Mailed Jun. 3, 2014", W/ English Claims, (Oct. 31, 2014), 17 pgs.

"Japanese Application Serial No. 2013-546177, Office Action mailed Jan. 20, 2015", with English Claims, 54 pgs.

"Korean Application Serial No. 2013-7019423, Amendment filed Jul. 22, 2013", with English Claims, 28 pgs.

"Korean Application Serial No. 2013-7019423, Response filed Sep. 25, 2014 to Notice of Preliminary Rejection mailed Jul. 29, 2014", with English Claims, 30 pgs.

* cited by examiner

FIG. 4
MU-MIMO TRANSMISSION

MU-GID ASSIGNMENT SIGNALING

FIG. 5

GID MANAGEMENT FRAME FIXED-LENGTH FRAME FORMAT

FIG. 6

GID MANAGEMENT FRAME VARIABLE-LENGTH FORMAT

FIG. 7

MU-MIMO ACCESS POINT AND USER STATION INCLUDING METHODS FOR MULTI-USER GROUP MANAGEMENT

TECHNICAL FIELD

Embodiments pertain to wireless communications. Some embodiments relate to multi-user (MU) multiple-input multiple-output (MIMO) (MU-MIMO) communication techniques. Some embodiments pertain to very-high throughput (VHT) basic service sets (BSSs) configured to operate in accordance with an IEEE 802.11 standard, such as the IEEE 802.11ac draft standard.

BACKGROUND

MIMO communication techniques allow for the communication of more than one spatial data stream. MU-MIMO techniques exploit the availability of multiple independent radio terminals in order to enhance the communication capabilities of each individual terminal. MU-MIMO techniques use a space-division multiple access (SDMA) technique to allow a terminal to transmit to or receive from multiple terminals in the same frequency band simultaneously.

Since a MU-MIMO transmission can include a limited number of spatial data streams, one issue with MU-MIMO communications is managing the various terminals for configuring MU-MIMO transmissions. Thus, there are general needs for MU-MIMO access points, user stations and methods for managing user stations for MU-MIMO communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
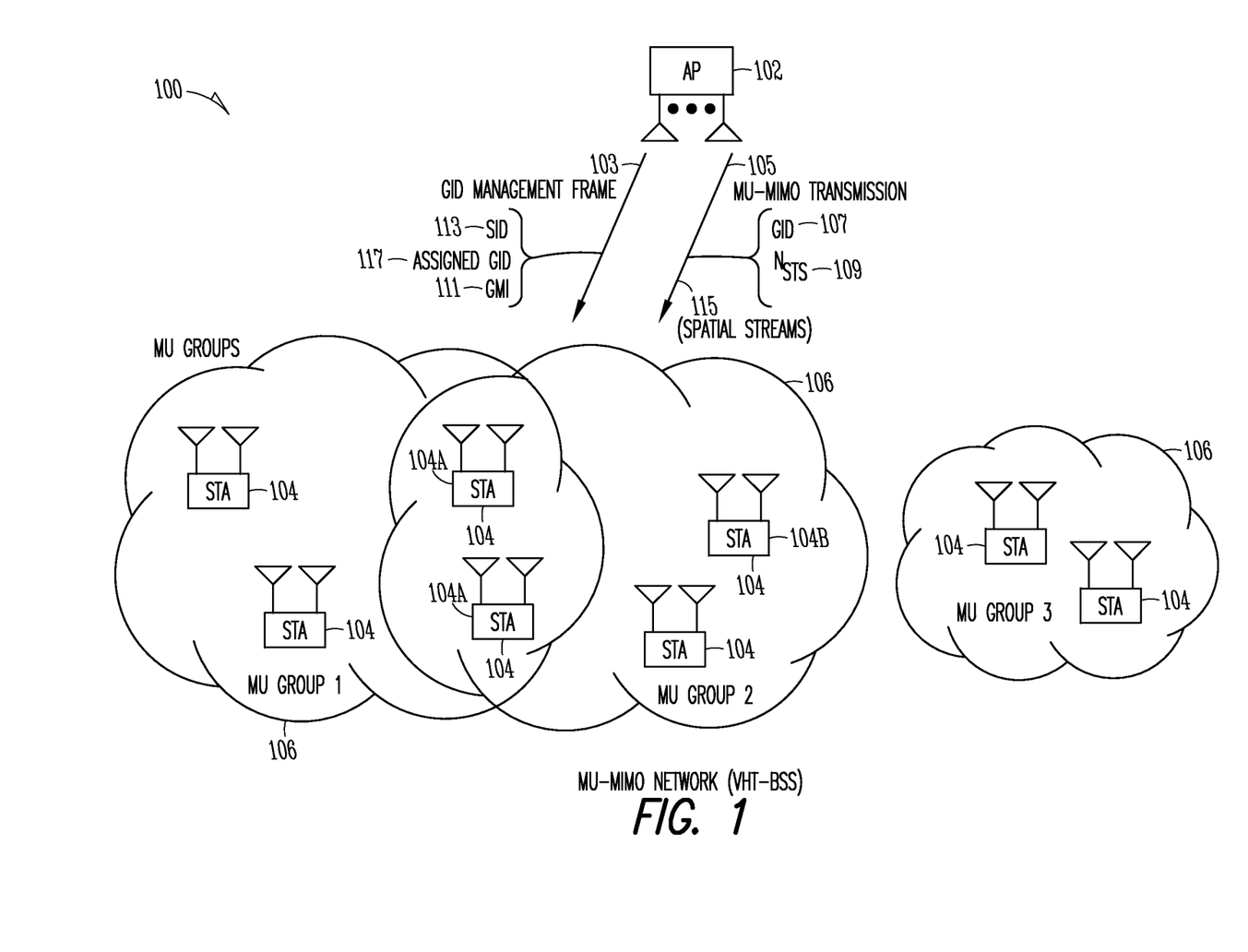
FIG. 1 illustrates a MU-MIMO network in accordance with some embodiments.

FIG. 1 illustrates a MU-MIMO network 100 in accordance with some embodiments. MU-MIMO network 100 may include a MU-MIMO access point (AP) 102 and a plurality of associated user stations (STA) 104. The access point 102 and at least some of the user stations 104 may be configured for MU-MIMO communications in which the MU-MIMO access point 102 may transmit MU-MIMO transmissions for reception by the MU-MIMO configured user stations 104.

In accordance with embodiments, the MU-MIMO access point 102 may manage groups of two or more user stations 104 for MU-MIMO communications in which user stations 104 are assigned to one or more MU groups 106 for receipt of a MU-MIMO transmission 105. These embodiments are described in more detail below.

In accordance with embodiments, the MU-MIMO access point 102 may assign a MU group identifier (GID) 117 and a group member index (GMI) 111 to each of a plurality of associated user stations 104. Each GID 117 may be assigned to a different MU group 106 of two or more of the associated user stations 104. The assigned GMI 111 may indicate an ordinate position of a user station 104 in an assigned MU group 106. The MU-MIMO access point 102 may also be configured to transmit a MU-MIMO transmission 105 that includes a plurality of spatial streams 115 and one of the assigned GIDs 107. The MU-MIMO transmission 105 may be destined for user stations 104 of a single MU group 106 that is indicated by the GID 107 that is included within the MU-MIMO transmission 105. In these embodiments, a subset (i.e., one or more) of the spatial streams 115 may be intended for each user station 104 of the MU group 106 that is identified by the GID 107 transmitted within the MU-MIMO transmission 105. The GID 107, 117 and the GMI 111 may be integer values.

The MU-MIMO transmission 105 may be a single transmission (e.g., a single packet such as a PPDU) comprising a plurality of frames that are intended for more than one user station 104. The MU-MIMO transmission 105 may include two or more spatial streams 115. In accordance with embodiments, the GID 107 transmitted within a MU-MIMO transmission 105 may indicate for which MU group 106 of user stations 104 the MU-MIMO transmission 105 is intended. As described in more detail below, a user station's assigned GMI 111 may be used by a user station 104 of the MU group 106 to determine which subset of the spatial streams 115 is intended for the user station 104.

The MU-MIMO access point 102 may utilize a downlink (DL) SDMA technique to transmit at least the portion of the MU-MIMO transmission 105 that includes the one or more spatial streams 115. In some embodiments, the MU-MIMO network 100 may be a very-high throughout (VHT) base station service set (BSS) configured to operate in accordance with one of the IEEE 802.11 standards or proposed/draft standards, such as the IEEE 802.11ac proposed/draft standard.

In accordance with embodiments, based on the GID 107 received within the MU-MIMO transmission 105, a user station 104 may be configured to determine whether or not it is a member of the MU group to determine if it needs to demodulate one or more of the spatial streams 115 of a received MU-MIMO transmission 105. Based on the GMI 111 previously assigned to the user station 104, the user station 104 may further determine which subset of the one or more of the spatial streams 115 in the MU-MIMO transmission 105 to demodulate.

For example, user station 104B may be assigned a GID value of two and a GMI value of three. In these embodiments, when the user station 104B receives a MU-MIMO transmission 105 that includes a GID value of two, it may determine that the received MU-MIMO transmission 105 is intended for the members of its MU-MIMO group and therefore that one or more of the spatial streams 115 of the MU-MIMO transmission 105 may be demodulated. The user station 104B may use its assigned GMI value of three to determine which subset of the spatial streams 115 in the MU-MIMO transmission 105 to demodulate. These embodiments are described in more detail below.

In some embodiments, the MU-MIMO access point 102 may be configured to assign one or more GIDs 117 to a single user station 104 or update the one or more GIDs 117 of a single user station 104 by transmitting a GID management frame 103. GID management frame 103 may be intended for a single user station 104 and may include a station ID (SID) 113, one or more assigned GIDs 117, and a GMI 111 for each assigned GID 117. These embodiments are discussed in more detail below.

In some embodiments, the MU-MIMO access point 102 may also include a number of spatial streams ($N_{sts}$) field 109 within the MU-MIMO transmission 105. The $N_{sts}$ field 109 may indicate the number of spatial streams 115 (e.g., space-time streams) that a particular user station 104 is to demodulate. A user station 104 may be configured to use the assigned GMI 111 that is associated with the GID 107 of a MU-MIMO transmission 105 to determine which portion of the $N_{sts}$ field 109 to read. The portion of the $N_{sts}$ field 109 may indicate to the user station 104 which subset of the spatial streams 115 of the MU-MIMO transmission 105 to demodulate.

In some embodiments, the GMI 111 assigned to a user station 104 may indicate the order of the spatial streams 115 to demodulate. For example, a GMI of two may indicate to a user station 104 to demodulate the subset of spatial streams 115 indicated in a second position of the $N_{sts}$ field 109.

Although FIG. 1 illustrates that MU groups 106 include user stations 104 that are geographically nearer to each other, this is for illustrative purposes only and is not a requirement as user stations 104 selected for a MU group 106 may be geographically dispersed. In accordance with embodiments, user stations 104 need only be separated by an inch or so to be able to receive through different spatial channels.

Figure 2:
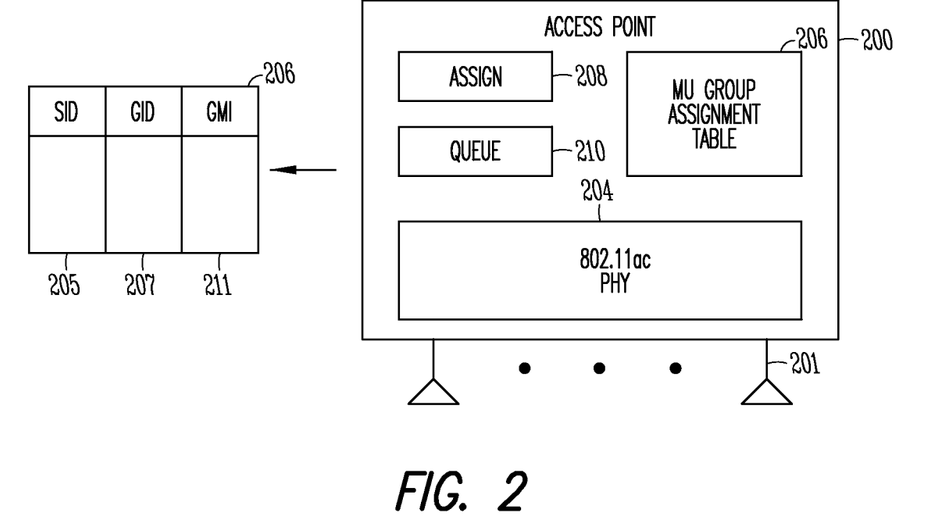
FIG. 2 is a functional block diagram of a MU-MIMO access point in accordance with some embodiments.

FIG. 2 is a functional block diagram of a MU-MIMO access point 200 in accordance with some embodiments. The MU-MIMO access point 200 may be suitable for use as MU-MIMO access point 102 (FIG. 1). The MU-MIMO access point 200 may include, among other things, physical-layer (PHY) circuitry 204 for communicating with user stations 104 (FIG. 1) in accordance with MU-MIMO techniques. The MU-MIMO access point 200 may be configured for transmitting a MU-MIMO transmission 105 (FIG. 1) using a plurality of spatially separate antennas 201.

In accordance with embodiments, the MU-MIMO access point 200 may maintain a MU group assignment table 206 to identify the user stations of each MU group 106 (FIG. 1). In some embodiments, the MU group assignment table 206 may include GIDs 207 that are assigned to each user station 104 and a GMI 211 associated with each assigned GID 207. Table 206 may use a station ID (SID) 205 to identify each user station 104 of an assigned group. The station ID 205 may be a MAC address of the user station 104 although other identifiers may be used to uniquely identify each user station 104 that is associated with the MU-MIMO access point 200.

In some embodiments, the MU-MIMO access point 200 may include an assignment block 208 to select associated user stations 104 for assignment to a MU group 106 and to assign a GID 207 to the user stations 104 of the selected MU group 106. In some embodiments, the station ID 205 may be an association ID or a receiver MAC address, although this is not a requirement.

In accordance with embodiments, the MU-MIMO access point 200 may select user stations 104 for assignment to one or more MU groups 106 and may assign one GID 207 for each assigned MU group 106. Each MU group 106 of user stations 104 may be is assigned a different GID 207. Some user stations, such as user stations 104A, may belong to more than one MU group 106.

In accordance with some embodiments, the MU-MIMO access point 200 may queue traffic for each MU group 106 of user stations 104 based on the assigned GIDs 207. In these embodiments, the MU-MIMO access point 200 may select one of the GIDs 207 for which traffic has been queued and generate a MU-MIMO transmission 105 for the user stations 104 of the selected GID 207. The MU-MIMO transmission 105 may be configured to include the selected GID 207 and to include the traffic queued for the user stations 104 of the selected GID 207.

In some embodiments, the MU-MIMO access point 200 may include queue block 210 to queue traffic and select a GID 207 for which traffic is queued. The PHY-layer circuitry 204 may be configured to generate the MU-MIMO transmission 105 for the stations of the selected MU group 106. In some embodiments, the MU-MIMO access point 200 may segregate the traffic queued for the user stations 104 of the selected MU group 106 for transmission within one or more spatial streams 115. The MU-MIMO access point 200 may also include the $N_{sts}$ field 109 (FIG. 1) in the preamble to indicate which subset of the spatial streams of the MU-MIMO transmission 105 each user station 104 of the selected MU group 106 is to demodulate based on each user station's GMI 211.

In some embodiments, the MU-MIMO access point 200 may select user stations 104 for assignment to a MU group 106 based on channel characteristics. In these embodiments, user stations 104 with similar channel characteristics may be assigned to the same MU group 106. In some embodiments, the MU-MIMO access point 200 may group user stations 104 into MU groups 106 for efficient traffic distribution to multiple users simultaneously with a MU-MIMO transmission. The MU-MIMO access point 200 may group user stations 104 in various combinations with other stations for increased flexibility in creating MU-MIMO transmissions.

In some embodiments, the MU-MIMO access point 200 may add user stations 104 to MU groups 106, may remove user stations 104 from MU groups 106, and may delete MU groups 106 as traffic patterns change and as channel characteristics change. These embodiments are described in more detail below.

As mentioned above, in some embodiments, the MU-MIMO access point 200 may be configured to assign one or more GIDs 207 to a single user station 104 or update the one or more GIDs 207 of a single user station 104 by transmitting a GID management frame 103 (FIG. 1). The GID management frame 103 may include an assignment of one or more GIDs 207 and an assignment of a GMI 211 for each of the one or more assigned GIDs 207 assigned to a particular user station 104. The GID management frame 103 may be a unicast frame that is addressed to the single user station 104. In some embodiments, the GID management frame 103 may include a station identifier, such as an SID 205, indicating which user station 104 that the GID management frame 103 is intended for.

Accordingly, a single GID management frame 103 may be used to assign more than one GID 207 to a user station 104 (i.e., since a user station 104 may be a member of more than one MU group 106) as well as to assign a GMI 211 for each assigned GID 207. In this way, an individual user station 104 can be added to or deleted from a MU group 106 without affecting the membership of other user stations 104 of the MU group 106.

In some embodiments, physical-layer circuitry 204 may be an IEEE 802.11ac PHY, such as a WiFi radio, and may be configured for DL SDMA transmissions. Although the term 'access point' has been used to describe MU-MIMO access point 200, the term 'base station' may also be suitable. Although the MU-MIMO access point 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the MU-MIMO access point 200 may refer to one or more processes operating on one or more processing elements.

In some embodiments, the MU-MIMO access point 200 may configure the MU-MIMO transmission 105 for transmission over a channel bandwidth comprising a primary access channel having a fixed bandwidth and a secondary channel of variable bandwidth. The primary access channel may have a bandwidth of 20 MHz and the secondary channel may have a bandwidth of up to seven 20 MHz portions of bandwidth to achieve a total or maximum channel bandwidth of up to 160 MHz. The preamble of the MU-MIMO transmission 105 may be transmitted on each 20 MHz portion of the channel bandwidth.

In some embodiments, MU-MIMO access point 200 may utilize a carrier-sense multiple access/collision avoidance (CSMA/CA) protocol for channel access. In these embodiments, the access channel that wins the transmission opportunity (TXOP) may be the primary access channel. In some embodiments, the primary and the secondary channels comprise non-contiguous portions of spectrum. In other embodiments, the primary and the secondary channels comprise contiguous portions of spectrum.

Figure 3:
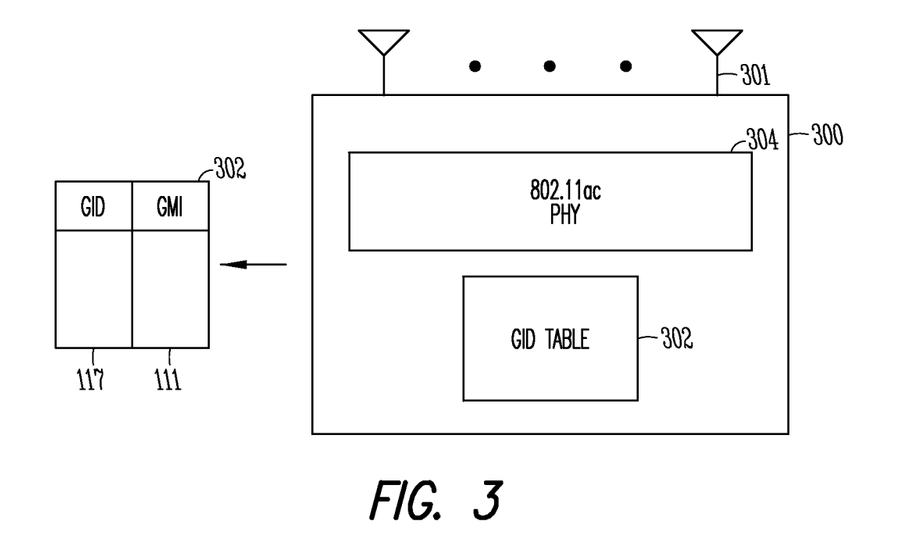
FIG. 3 is a functional block diagram of a user station in accordance with some embodiments.

FIG. 3 is a functional block diagram of a user station 300 in accordance with some embodiments. The user station 300 may be suitable for use as any of the user stations 104 illustrated in FIG. 1. User station 300 may include, among other things, a GID table 302 and physical-layer (PHY) circuitry 304. Physical-layer circuitry 304 may be configured to communicate with a MU-MIMO access point, such as MU-MIMO access point 102 (FIG. 1) and may use a plurality of spatially separated antennas 301. The user station 300 may be configured to maintain the GID table 302 therein to identify each of the one or more assigned GIDs 117 (FIG. 1) as well as to identify a GMI 111 (FIG. 1) associated with each assigned GID 117. In response to receipt of GID management frame 103 (FIG. 1), the user station 300 may update the information in its GID table 302.

In these embodiments, upon receipt of a MU-MIMO transmission 105 (FIG. 1), the user station 300 may be configured to index the GID 117 received in the MU-MIMO transmission 105 in its GID table 302 to determine whether or not it is a member of the MU group 106 indicated by the value of the GID 117. When the user station 300 is a member of the MU group 106 indicated by the GID 117 received in the MU-MIMO transmission 105, the user station 300 may identify the GMI 111 associated with GID 117 from the GID table 302. Based on the associated GMI 111, the user station 300 may then determine which subset of the one or more of the spatial streams 115 (FIG. 1) to demodulate based on the $N_{sts}$ field 109 (FIG. 1) in the received MU-MIMO transmission 105.

In this way, the GID table 302 may be used as a look-up-table (LUT) to determine whether or not the user station 300 is a member of a particular MU group and to look up the GMI 111 that is associated with a MU group 106 in which it is a member. Accordingly, the user station 300 can determine whether or not it needs to demodulate a subsequent portion of a MU-MIMO transmission 105 that includes the one or more spatial streams 115. Furthermore, a user station 104 may determine which subset of the spatial streams 115 of the MU-MIMO transmission 105 to demodulate. In this way, the user station 300 does not need to expend the energy by demodulating subsequent portions of MU-MIMO transmission 105 that are not intended for it.

In some embodiments, the GID 107 and the $N_{sts}$ field 109 are included within a preamble of the MU-MIMO transmission 105 that is configured to be receivable by all of the associated user stations 104. In these embodiments, the $N_{sts}$ field 109 and the GID 107 may both be within the same signaling field, although this is not a requirement.

Although the user station 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the user station 300 may refer to one or more processes operating on one or more processing elements.

Figure 4:
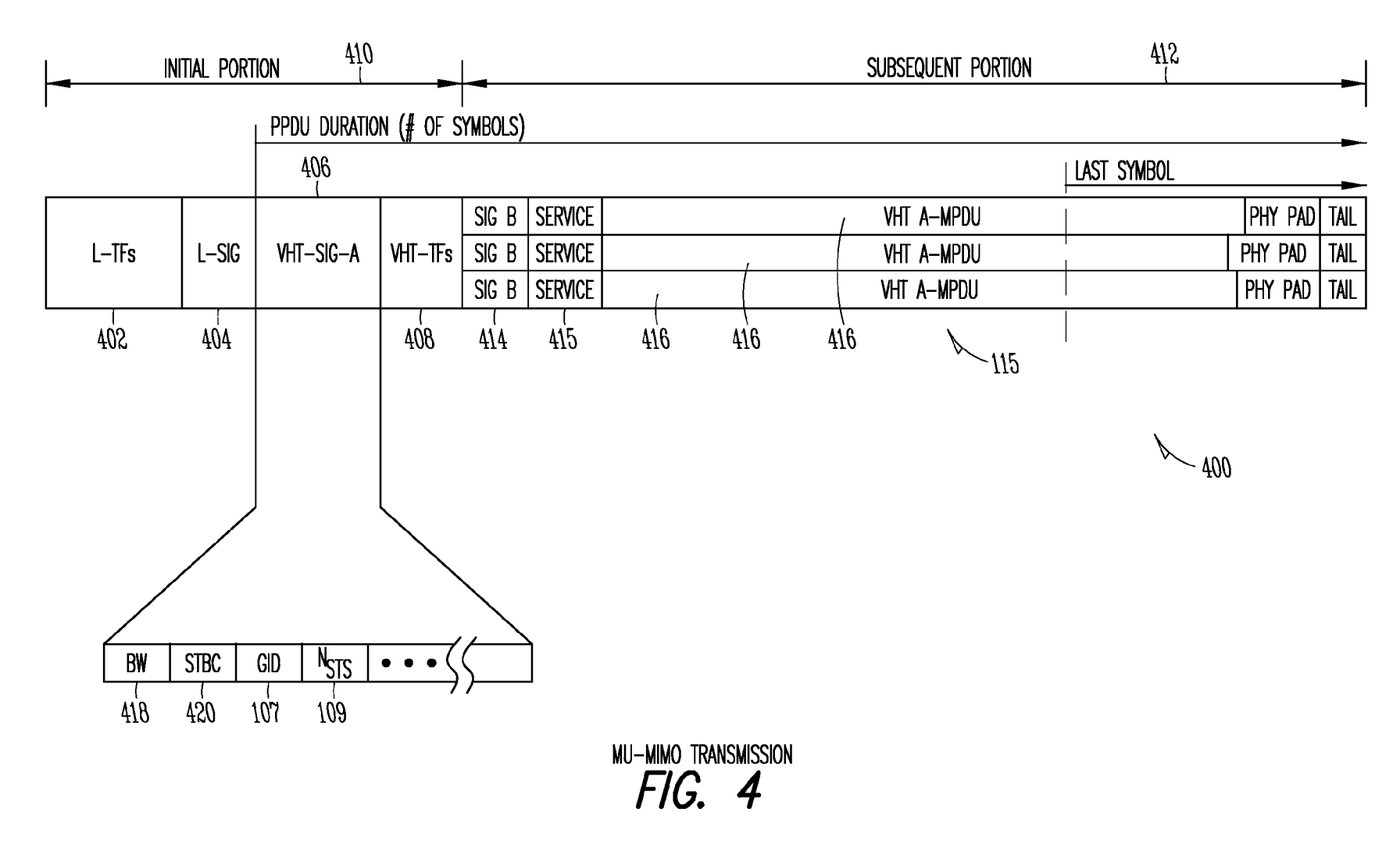
FIG. 4 is an illustration of a MU-MIMO transmission in accordance with some embodiments.

FIG. 4 is an illustration of a MU-MIMO transmission 400 in accordance with some embodiments. The MU-MIMO transmission 400 may be suitable for use as MU-MIMO transmission 105 (FIG. 1). The MU-MIMO transmission 400 may include an initial portion 410 which may comprise its preamble, and a subsequent portion 412 which may include the one or more spatial streams 115. As illustrated in FIG. 4, the preamble of the MU-MIMO transmission 400 may include a VHT signaling field, such as VHT-SIG-A field 406. The GID 107 and the $N_{sts}$ field 109 may be included within the VHT-SIG-A field 406 of the MU-MIMO transmission 400 as shown.

The MU-MIMO transmission 400 may also include legacy training fields (L-TFs) 402, non-HT signal field (L-SIG) 404, VHT training fields (VHT-TFs) 408, VHT-SIG B fields 414, service fields 415 and data fields 416. Each data field 416 may correspond to one of the spatial streams 115 of the PPDU.

The MU-MIMO access point 102 (FIG. 1) may be configured to transmit the initial portion 410 that comprises the preamble in non-directional (e.g., substantially omnidirectional) fashion. The access point 102 may be configured to transmit the subsequent portion 412 of the MU-MIMO transmission 400 that includes the plurality of spatial streams 115 in a directional fashion.

In these embodiments, the initial portion 410 that includes the VHT-SIG-A field 406 (which includes the GID 107 and the $N_{sts}$ field 109) that is transmitted in the non-directional fashion may be configured to be received by all associated user stations 104 (FIG. 1). The subsequent portion 412 that includes the plurality of spatial streams 115, when transmitted in a directional fashion, may be beamformed or precoded as described in more detail below.

A user station 104 may be configured to use an assigned GMI 111 (FIG. 1) that is associated with the GID 107 (FIG. 1)

of the MU-MIMO transmission 400 (read from the GID table 302 (FIG. 3)) to determine which portion of the $N_{sts}$ field 109 (FIG. 1) to read. The portion of the $N_{sts}$ field 109 may indicate to the user station 104 which subset of the spatial streams 115 of the MU-MIMO transmission 400 to demodulate. In some embodiments, the user station 104 may be configured to use the assigned GMI 111 to determine which three-bit portion of the $N_{sts}$ field 109 to read.

In some of these embodiments, the MU-MIMO access point 102 may apply beamforming techniques for the transmission of the subsequent portion 412. Beamforming coefficients for each spatial stream 115 may be based on channel characteristics of the user stations 104 of the MU group 106 that are to receive a particular spatial stream 115. The use of different beamforming coefficients for each spatial stream 115 allows each user station 104 of the MU group 106 to separate the different spatial streams 115 using signal processing techniques.

In some embodiments, the MU-MIMO access point 102 may precode the subsequent portion 412 using codewords based on a codebook (e.g., a precoding matrix) for beamforming. In these embodiments, channel estimation may be performed based on pilot signals transmitted by the MU-MIMO access point 102. Based on the channel information, a codeword that results in the maximum signal-noise-ratio (SNR) and a channel quality indictor (CQI) value corresponding to the codeword may be determined by a user station 104. The codeword and CQI may be fed back to the MU-MIMO access point 102 and the MU-MIMO access point 102 may configure the MU-MIMO transmission 400 for the user stations 104 of a selected MU group 106 based on the codewords and the CQI values. In some embodiments, the MU-MIMO transmission 400 may be configured based on the codewords and the CQI values so that a predetermined performance metric of the system is achieved or maximized. In these embodiments, at least the subsequent portion 412 of the MU-MIMO transmission 400 may be transmitted with a plurality of spatially separate antennas 201 (FIG. 2).

In some embodiments, a user station, such as user station 300 (FIG. 3), may refrain from demodulating the subsequent portion 412 of the MU-MIMO transmission 400 when the GID 107 included in the MU-MIMO transmission 400 is not assigned to the user station 300 that receives the MU-MIMO transmission 400. In these embodiments, the MU-MIMO transmission 400 may be discarded since it was not intended for that particular user station 300.

In some embodiments, the MU-MIMO access point 102 may create a unique MU group 106 for each possible combination of user stations 104. This may result in a large number of MU groups 106 and a large GID table 302 when there is a high number of user stations 104 associated with the MU-MIMO access point 102 (i.e., because each user station 104 would be included in many MU groups 106).

In other embodiments, multiple combinations of user stations 104 may use the same GID to reduce the size of the GID table 302. When multiple user station combinations use the same GID, user stations 104 receiving a MU-MIMO transmission 400 may end up demodulating spatial streams 115 that are not intended for that user station 104. These frames may be discarded. These embodiments that use many multiple user-station combinations may provide a trade-off between slightly increased power consumption for a reduction in the size of the GID table 302. In some embodiments, a MU group 106 may include a single user station 104.

In accordance with embodiments, the number of spatial streams 115 that may be included in the MU-MIMO transmission 400 may depend on, among other things, the number of antennas 201 (FIG. 2) used by the MU-MIMO access point 102 for transmitting the MU-MIMO transmission 400. For example, when eight antennas 201 are used, up to eight spatial streams 115 may be transmitted.

In some embodiments, the MU-MIMO transmission 400 may include a channel bandwidth parameter 418 to indicate the channel bandwidth used, a space-time block coding parameter 420, and a modulation and coding parameter (not separately illustrated) to indicate a modulation and coding scheme of subsequent portions of the MU-MIMO transmission 400 as transmitted over the channel bandwidth. In some embodiments, the MU-MIMO transmission 400 may indicate which 20 MHz portions of the spectrum comprise the channel bandwidth of the MU-MIMO transmission 400.

Figure 5:
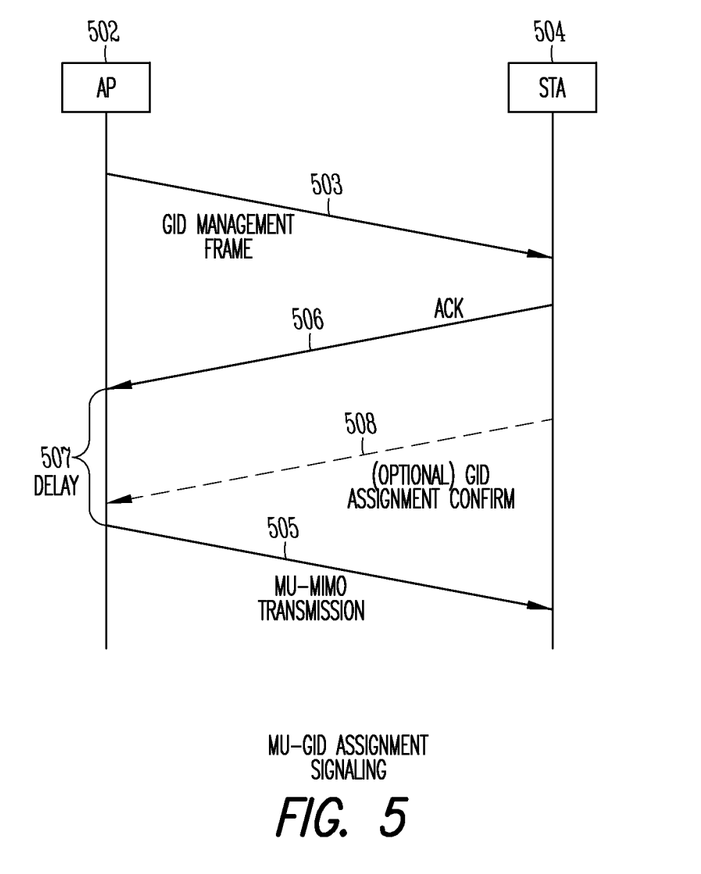
FIG. 5 illustrates MU group identifier (GID) signaling in accordance with some embodiments.

FIG. 5 illustrates MU-GID signaling in accordance with some embodiments. An access point 502 may correspond to MU-MIMO access point 102 (FIG. 1) and user station (STA) 504 may correspond to one of user stations 104 (FIG. 1). As described above, the access point 502 may transmit a GID management frame 503 to assign one or more GIDs 117 (FIG. 1) to user station 504 or update the one or more GIDs 117 of the user station 504. GID management frame 503 may correspond to GID management frame 103 (FIG. 1). After transmitting the GID management frame 503 to the user station 504, the access point 502 may be configured to delay transmitting a MU-MIMO transmission 505 that includes a GID 107 (FIG. 1) that was assigned or updated by the GID management frame 503.

In these embodiments, the MU-MIMO transmission 505 that is delayed includes the GID that was assigned to user station 504 (i.e., that had one of its GIDs assigned or updated). This delay may be used to accommodate any processing delay of user station 504 associated with, for example, decrypting the GID management frame 503 and installing updates to the GID table 302 (FIG. 3).

In some embodiments, the delay may be a MU group addition delay 507 and may follow the receipt of an acknowledgement (ACK) 506 from the user station 504. The ACK 506 may be transmitted by the user station 504 to acknowledge receipt of the GID management frame 503. In some embodiments, MU group addition delay 507 may be a fixed or predetermined amount. In other embodiments, the MU group addition delay 507 may be determined based on delay amounts provided by user stations 104 associated with the MU-MIMO access point 102 (e.g., when a user station 504 joins the VHT BSS).

In some embodiments, each user station 104 may provide a delay amount associated with installing or updating its GID table 302. The provided delay amount may be an upper bound on a station's processing delay. The access point 502 may utilize a greatest of these delay amounts (i.e., from the user station with the greatest delay) as the MU group addition delay 507. In some embodiments, the delay amount may be provided by a user station 104 during association in a field of an association request frame, although this is not a requirement.

In some alternate embodiments, as illustrated in FIG. 5, after transmitting the GID management frame 503 to the user station 504, the access point 502 may delay transmitting the MU-MIMO transmission 505 until receipt of a GID assignment confirmation frame 508 from the user station 504 for which the GID management frame 503 was intended. In these embodiments, user stations 104 may be configured to transmit a GID assignment confirmation frame 508 to the MU-MIMO access point 502 when a user station 504 has successfully installed or updated its GID table 302 based on the received GID management frame 503.

In some embodiments, the access point 502 may update entries for a particular user station 104 listed in its MU group assignment table 206 (FIG. 2) after transmitting the GID management frame 503. The access point 502 may wait until an ACK 506 is received from the user station 504 before transmitting the MU-MIMO transmission 505 to the user station 504 using the updated table 206 to ensure that the user station 504 received the GID management frame 503. In some alternate embodiments, the access point 502 may wait until a GID assignment confirmation frame 508 is received from the user station 504 before transmitting the MU-MIMO transmission 505 using the updated table 206 to ensure that the user station 504 has installed or updated its GID table 302.

In some embodiments, the access point 502 may wait until the ACK 506 is received from the user station 504 before the access point 502 updates its table 206. In some embodiments, the access point 502 may wait until a GID assignment confirmation frame 508 is received from the user station 504 before the access point 502 updates its table 206.

Figure 6:
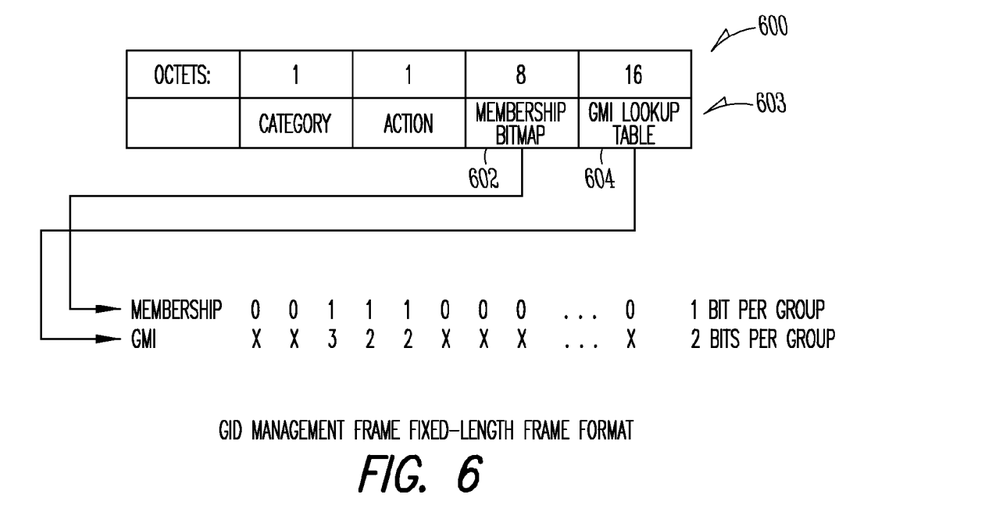
FIG. 6 illustrates a GID management frame with a fixed-length frame format in accordance with some embodiments.

FIG. 6 illustrates a GID management frame 603 with a fixed-length frame format 600 in accordance with some embodiments. GID management frame 603 may be suitable for use as GID management frame 103 (FIG. 1) and may have a fixed-length frame format 600. In these embodiments, the GID management frame 603 may be configured to provide a full-table update to a user station's GID table 302 (FIG. 3). In these embodiments, the GID management frame 603 may include a membership bitmap field 602 and a GMI lookup table field 604. The membership bitmap field 602 may comprise a bitmap in which each bit of the bitmap represents whether or not the user station 300 (FIG. 3) is a member of a corresponding MU group. The position of each bit of the bitmap of the membership bitmap filed 602 may be indexed by the GID. The GMI lookup table field 604 may indicate the GMI for the user station 300 for an associated GID (i.e., for a corresponding MU group).

In the bitmap of the membership bitmap field 602, a bit that is set to one may indicate that the user station 300 is a member of the group indicated by the position of the bit. For each bit that is set to one in the membership bitmap field 602, the corresponding bit in the GMI lookup table field 604 indicates the GMI value for the associated GID. In response to receipt of the GID management frame 603, the user station 300 may update its GID table 302 (FIG. 3) based on the information in the membership bitmap field 602 and the corresponding information in the GMI lookup table field 604.

For example, the bit that is set to one in the fourth position of the membership bitmap field 602 (as shown in FIG. 6) indicates that the user station 300 (for which the GID management frame 603 is intended) is assigned to be a member of the fourth MU group (i.e., GID=4). The corresponding GMI of two in the GMI lookup table field 604 indicates that the user station 300 should look at the second portion of the $N_{sts}$ field 109 (e.g., B16 to B18 of the VHT-SIG-A field 406 (FIG. 4)) for the number and order of the spatial streams 115 (FIG. 1) to demodulate. Each two bits of the GMI lookup table field 604 may indicate the GMI of the user station for a corresponding MU group. In this way, the user station 300 can determine which subset of the spatial streams 115 to demodulate based on a portion of the $N_{sts}$ field 109.

In some embodiments, the membership bitmap field 602 may be eight octets long and the GMI lookup table field 604 may be sixteen octets long, although this is not a requirement. There may be sixty-four GID management fields, each of which contains one bit to indicate the membership status of a user station in the corresponding MU group and two bits to indicate the group member index (GMI) of a station in the corresponding MU group.

Figure 7:
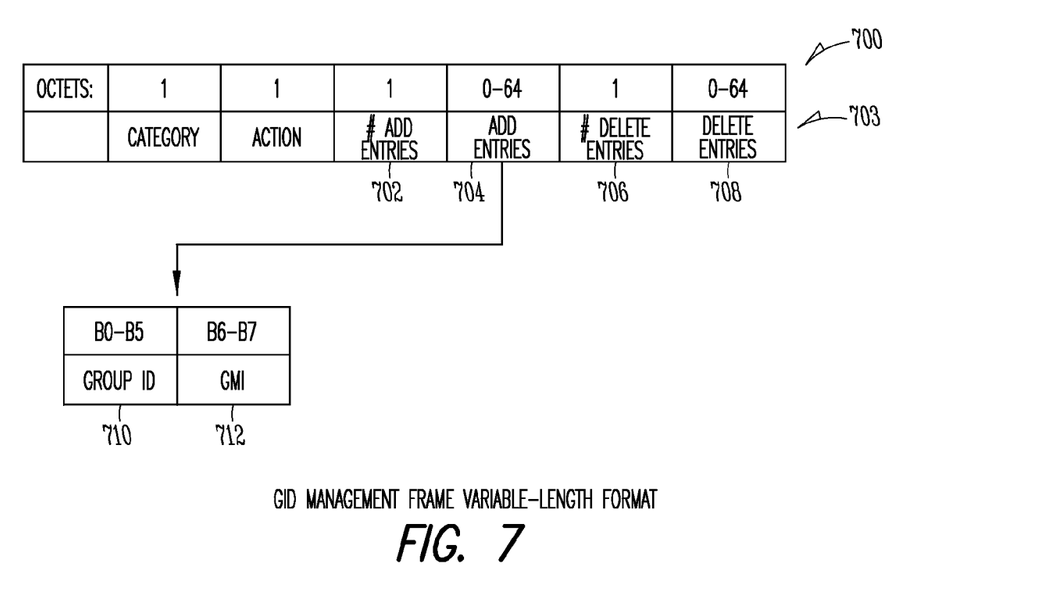
FIG. 7 illustrates a GID management frame with a variable-length frame format in accordance with some embodiments.

FIG. 7 illustrates a GID management frame 703 with a variable-length frame format 700 in accordance with some embodiments. GID management frame 703 may be suitable for use as GID management frame 103 (FIG. 1) and may have a variable-length frame format 700. In these embodiments, a GID management frame 703, when configured in accordance with the variable-length frame format 700, may provide additions, deletions or changes to a user station's GID table 302 (FIG. 3). In response to receipt of the GID management frame 703, the user station 300 (FIG. 3) may update its GID table 302.

In these variable-length frame format embodiments, the GID management frame 703 may include a field 702 to indicate the number of entries to be added to the GID table 302 followed by one or more fields 704 to indicate which entries are to be added (e.g., one octet per entry). In these embodiments, the GID management frame 703 may also include a field 706 to indicate the number of entries to be deleted followed by a number of fields 708 to indicate which entries are to be deleted (e.g., one octet per entry). In these variable-length frame format embodiments, each add entry element of field 704 may include a GID 710 of the MU group to which the user station 300 is being added or for which the station's GMI is being changed as well as the new GMI 712 associated with that GID 710. Each delete entry element of field 708 may include the GID of the MU group from which the user station 300 is being removed.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the machine may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An access point in a MU-MIMO network including a plurality of associated user stations, the access point adapted to:
   assign a multi-user (MU) group identifier (GID) and a group member index (GMI) to each of the plurality of associated user stations by transmitting an individually-addressed GID management frame to each of the user stations that includes the assigned GID and GMI, the GID indicating one MU group of two or more of the associated user stations, the assigned GMI indicating a user station's ordinate position in an assigned MU group;

receive an acknowledgement (ACK) from each user station to acknowledge receipt of the individually-addressed GID management frame; and transmit a MU-MIMO transmission to a MU group after receipt of ACKs from the user stations, the MU-MIMO transmission including a plurality of separate space-time streams and one of the assigned GIDs, the plurality of separate space-time streams being transmitted on a transmission bandwidth that comprises one or more 20 MHz channels, wherein a subset of the space-time streams is intended for each user station of the MU group that is identified by the GID transmitted within the MU-MIMO network, wherein the MU-MIMO transmission includes a bandwidth indicator, the GID and a number of space-time streams ($N_{sts}$) field in a preamble thereof, the $N_{sts}$ field indicating a number of the space-time streams that a user station is to demodulate, the bandwidth indicator indicating the transmission bandwidth of the plurality of separate space-time streams, the bandwidth indicator being configurable to indicate the transmission bandwidth of up to 160 MHz, wherein the ordinate position in an assigned MU group refers to a position of the $N_{sts}$ field for a user station to read that indicates which subset of space-time streams to demodulate, and wherein the MU-MIMO transmission comprises a simultaneous transmission of data units to the associated stations user stations in the separate space-time streams, wherein the GID management frame includes an assignment of one or more GIDs and an assignment of a GMI for each of said one or more GIDs, wherein the GID management frame is a fixed length frame format with a unicast frame that includes a membership field that is eight octets long and a GMI table field that is sixteen octets long, wherein bits of the membership field indicate whether the user station is a member of a corresponding group with a GID equal to an index of the corresponding bit, wherein each pair of bits in the GMI table field indicate an ordinate position in the corresponding group with the GID of an index of the pair of bits, and wherein the access point is configured to transmit the preamble of the MU-MIMO transmission in a non-directional fashion, and wherein a subsequent portion of the MU-MIMO transmission includes the plurality of space-time streams and is transmitted in a directional fashion.

2. The access point of claim 1, wherein:
the assigned GMI is such that a user station of the MU group is able to use the assigned GMI to determine which portion of the Nsts field to read.

3. The access point of claim 2 wherein the preamble of the MU-MIMO transmission includes a very-high-throughput signaling-A (VHT-SIG-A) field, and wherein the GID and the Nsts field are included within the VHT-SIG-A field.

4. The access point of claim 1, wherein after transmitting the GID management frame, the access point is configured to delay transmitting of a MU-MIMO transmission that includes a GID.

5. The access point of claim 1, further configured to select user stations for assignment to one or more of the MU groups based on at least one of channel characteristics or efficient traffic distribution.

6. The access point of claim 1, wherein the access point is further configured to:
maintain a MU group assignment table;
queue traffic for MU groups;
select one MU group for which two or more user stations that are members of the group have queued traffic; and
generate a MU-MIMO transmission for the user stations of the selected MU group,
wherein the MU-MIMO transmission is configured to include the GID of the selected MU group and to include the traffic queued for the user stations of the selected MU group.

7. The access point of claim 1, wherein transmitted in the directional fashion comprises: transmitting the subsequent portion of the MU-MIMO using beamforming.

8. A method of managing a plurality of user stations in a MU-MIMO network comprising:
assigning a multi-user (MU) group identifier (GID) and a group member index (GMI) to each of the plurality of associated user stations by transmitting an individually-addressed GID management frame to each of the user stations that includes the assigned GID and GMI, the GID indicating one MU group of two or more of the associated user stations, the assigned GMI indicating a user station's ordinate position in an assigned MU group;

receiving an acknowledgement (ACK) from each the user station to acknowledge receipt of the individually-addressed GID management frame; and transmitting a MU-MIMO transmission to a MU group after receipt of ACKs from the user stations, the MU-MIMO transmission including a plurality of separate space-time streams and one of the assigned GIDs, the plurality of separate space-time streams being transmitted on a transmission bandwidth that comprises one or more 20 MHz channels, wherein a subset of the space-time streams is intended for each user station of the MU group that is identified by the GID transmitted within the MU-MIMO network, wherein the MU-MIMO transmission includes a bandwidth indicator, the GID and a number of space-time streams ($N_{sts}$) field in a preamble thereof, the $N_{sts}$ field indicating a number of the space-time streams that a user station is to demodulate, the bandwidth indicator indicating the transmission bandwidth of the plurality of separate space-time streams, the bandwidth indicator being configurable to indicate the transmission bandwidth of up to 160 MHz, wherein the ordinate position in an assigned MU group refers to a position of the $N_{sts}$ field for a user station to read that indicates which subset of space-time streams to demodulate, wherein the MU-MIMO transmission comprises a simultaneous transmission of data units to the associated stations user stations in the separate space-time streams, wherein the GID management frame includes an assignment of one or more GIDs and an assignment of a GMI for each of said one or more GIDs, wherein the GID management frame is a fixed length frame format with a unicast frame that includes a membership field that is eight octets long and a GMI table field that is sixteen octets long, wherein bits of the membership field indicate whether the user station is a member of a corresponding group with a GID equal to an index of the corresponding bit, wherein each pair of bits in the GMI table field indicate an ordinate position in the corresponding group with the GID of an index of the pair of bits, and wherein the access point is configured to transmit the preamble of the MU-MIMO transmission in a non-directional fashion, and wherein a subsequent portion of the MU-MIMO transmission includes the plurality of space-time streams and is transmitted in a directional fashion.

9. The method of claim 8, wherein:
the assigned GMI is such that a user station of the MU group is able to use the assigned GMI to determine which portion of the Nsts field to read.

10. The method of claim 9, wherein the preamble of the MU-MIMO transmission includes a very-high-throughput signaling-A (VHT-SIG-A) field, and wherein the GID and the Nsts field are included within the VHT-SIG-A field.

11. The method of claim 10, further including selecting user stations for assignment to one or more of the MU groups based on at least one of channel characteristics or efficient traffic distribution.

12. The method of claim 10, further including:
maintaining a MU group assignment table;
queuing traffic for MU groups;
selecting one MU group for which two or more user stations that are members of the group have queued traffic; and
generating a MU-MIMO transmission for the user stations of the selected MU group,
wherein the MU-MIMO transmission is configured to include the GID of the selected MU group and to include the traffic queued for the user stations of the selected MU group.

13. A non-transitory computer-readable storage medium containing instructions that, if executed, enable an access point to manage user stations in a multiple user multiple input multiple output (MU-MIMO) network by:
assigning a multi-user (MU) group identifier (GID) and a group member index (GMI) to each of the plurality of associated user stations by transmitting an individually-addressed GID management frame to each of the user stations that includes the assigned GID and GMI, the GID indicating one MU group of two or more of the associated user stations, the assigned GMI indicating a user station's ordinate position in an assigned MU group;
receiving an acknowledgement (ACK) from each the user station to acknowledge receipt of the individually-addressed GID management frame; and
transmitting a MU-MIMO transmission to a MU group after receipt of ACKs from the user stations, the MU-MIMO transmission including a plurality of separate space-time streams and one of the assigned GIDs, the plurality of separate space-time streams being transmitted on a transmission bandwidth that comprises one or more 20 MHz channels,
wherein a subset of the space-time streams is intended for each user station of the MU group that is identified by the GID transmitted within the MU-MIMO network,
wherein the MU-MIMO transmission includes a bandwidth indicator, the GID and a number of space-time streams ($N_{sts}$) field in a preamble thereof, the $N_{sts}$ field indicating a number of the space-time streams that a user station is to demodulate, the bandwidth indicator indicating the transmission bandwidth of the plurality of separate space-time streams, the bandwidth indicator being configurable to indicate the transmission bandwidth of up to 160 MHz,
wherein the ordinate position in an assigned MU group refers to a position of the $N_{sts}$ field for a user station to read that indicates which subset of space-time streams to demodulate, and wherein the MU-MIMO transmission comprises a simultaneous transmission of data units to the associated stations user stations in the separate space-time streams,
wherein the GID management frame includes an assignment of one or more GIDs and an assignment of a GMI for each of said one or more GIDs,
wherein the GID management frame is a fixed length frame format with a unicast frame that includes a membership field that is eight octets long and a GMI table field that is sixteen octets long, and
wherein bits of the membership field indicate whether the user station is a member of a corresponding group with a GID equal to an index of the corresponding bit, wherein each pair of bits in the GMI table field indicate an ordinate position in the corresponding group with the GID of an index of the pair of bits.

14. The computer-readable medium of claim 13, wherein:
the assigned GMI is such that a user station of the MU group is able to use the assigned GMI to determine which portion of the Nsts field to read.

15. The computer-readable medium of claim 14, wherein the preamble of the MU-MIMO transmission includes a very-high-throughput signaling-A (VHT-SIG-A) field, and wherein the GID and the Nsts field are included within the VHT-SIG-A field.

16. The computer-readable medium of claim 15, wherein the access point is configured to transmit the preamble of the MU-MIMO transmission in a non-directional fashion, and wherein a subsequent portion of the MU-MIMO transmission includes the plurality of space-time streams and is transmitted in a directional fashion.

17. The computer-readable medium of claim 15, further enable the access point to manage user stations in the MU-MIMO network by selecting user stations for assignment to one or more of the MU groups based on at least one of channel characteristics or efficient traffic distribution.

18. The computer-readable medium of claim 15, further enable the access point to manage user stations in the MU-MIMO network by:
maintaining a MU group assignment table;
queuing traffic for MU groups;
selecting one MU group for which two or more user stations that are members of the group have queued traffic; and
generating a MU-MIMO transmission for the user stations of the selected MU group,
wherein the MU-MIMO transmission is configured to include the GID of the selected MU group and to include the traffic queued for the user stations of the selected MU group,
wherein the MU-MIMO transmission is configured to include the GID of the selected MU group and to include the traffic queued for the user stations of the selected MU group.

19. A system to manage transmission to a plurality of associated user stations in a MU-MIMO network, the system including a processor, a memory, and a radio, the system adapted to:
assign a multi-user (MU) group identifier (GID) and a group member index (GMI) to each of the plurality of associated user stations by transmitting an individually-addressed GID management frame to each of the user stations that includes the assigned GID and GMI, the GID indicating one MU group of two or more of the associated user stations, the assigned GMI indicating a user station's ordinate position in an assigned MU group;

receive an acknowledgement (ACK) from each the user station to acknowledge receipt of the individually-addressed GID management frame; and transmit a MU-MIMO transmission to a MU group after receipt of ACKs from the user stations, the MU-MIMO transmission including a plurality of separate space-time streams and one of the assigned GIDs, the plurality of separate space-time streams being transmitted on a transmission bandwidth that comprises one or more 20 MHz channels;

wherein a subset of the space-time streams is intended for each user station MU group that is identified by the GID transmitted within the MU-MIMO network, wherein the MU-MIMO transmission includes a bandwidth indicator, the GID and a number of space-time streams ($N_{sts}$) field in a preamble thereof, the $N_{sts}$ field indicating a number of the space-time streams that a user station is to demodulate, the bandwidth indicator indicating the transmission bandwidth of the plurality of separate space-time streams, the bandwidth indicator being configurable to indicate the transmission bandwidth of up to 160 MHz, wherein the ordinate position in an assigned MU group refers to a position of the $N_{sts}$ field for a user station to read that indicates which subset of space-time streams to demodulate, wherein the MU-MIMO transmission comprises a simultaneous transmission of data units to the associated stations user stations in the separate space-time streams, wherein the GID management frame includes an assignment of one or more GIDs and an assignment of a GMI for each of said one or more GIDs, wherein the GID management frame is a fixed length frame format with a unicast frame that includes a membership field that is eight octets long and a GMI table field that is sixteen octets long, wherein bits of the membership field indicate whether the user station is a member of a corresponding group with a GID equal to an index of the corresponding bit, wherein each pair of bits in the GMI table field indicate an ordinate position in the corresponding group with the GID of an index of the pair of bits, and wherein the access point is configured to transmit the preamble of the MU-MIMO transmission in a non-directional fashion, and wherein a subsequent portion of the MU-MIMO transmission includes the plurality of space-time streams and is transmitted in a directional fashion.

20. The system. of claim 19, wherein the assigned GMI is such that a user station of the MU group is able to use the assigned GMI to determine which portion of the Nsts field to read.

* * * * *